United States Patent Office.

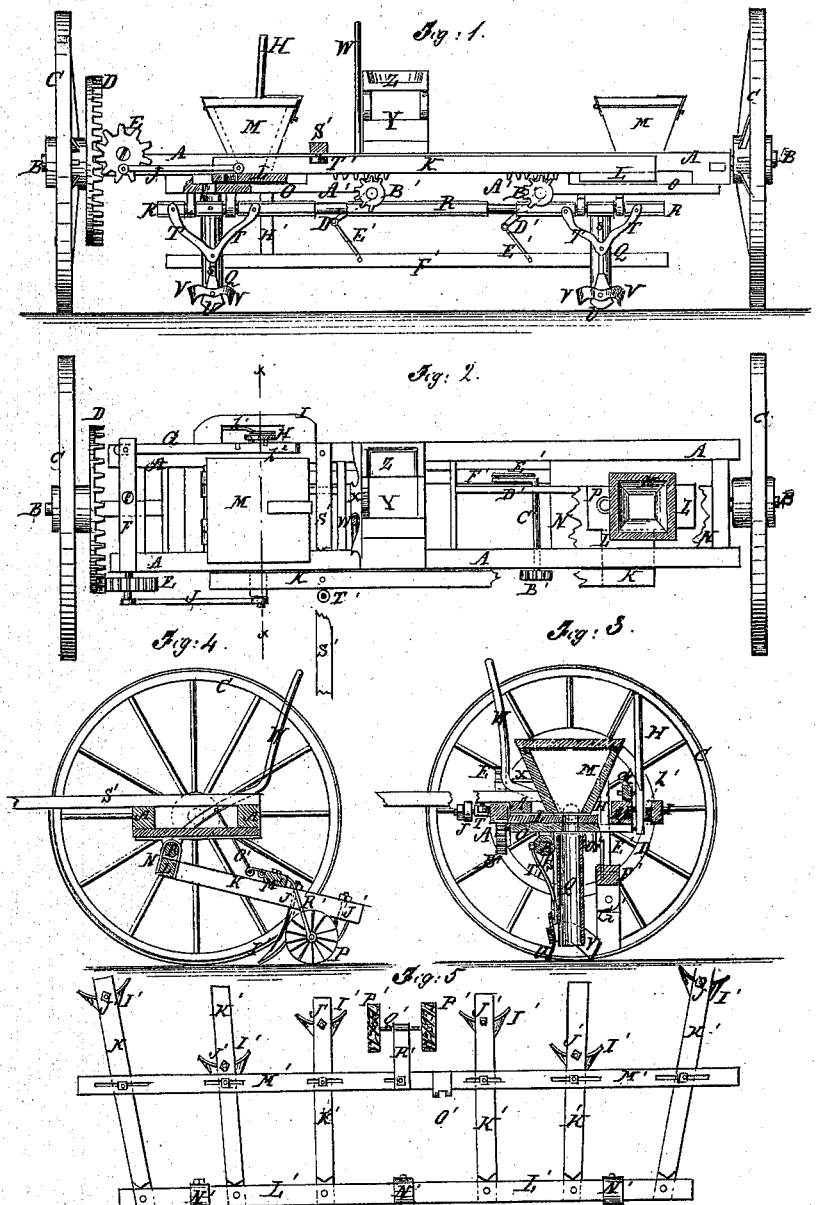

FRANKLIN UNDERWOOD, OF SOUTH RUTLAND, NEW YORK.

Letters Patent No. 112,516, dated March 7, 1871.

IMPROVEMENT IN COMBINED CORN-PLANTERS AND CULTIVATORS.

The Schedule referred to in these Letters Patent and making part of the same.

*To all whom it may concern:*

Be it known that I, FRANKLIN UNDERWOOD, of South Rutland, in the county of Jefferson and State of New York, have invented a new and useful improved Corn-Planter; and I do hereby declare that the following is a full, clear, and exact description thereof, which will enable others skilled in the art to make and use the same, reference being had to the accompanying drawing forming part of this specification.

Figure 1 is a front view of my machine arranged as a corn-planter, and part being broken away to show the construction.

Figure 2 is a top view of the same, parts being broken away to show the construction.

Figure 3 is a vertical cross-section of the same taken through the line $x\ x$, fig. 2.

Figure 4 is a detail cross-section of the same with a set of plows attached.

Figure 5 is a detail top view of the plow-beams and their connecting-bars and attachments, which are shown, in fig. 4, attached to the frame of the planter.

Similar letters of reference indicate corresponding parts.

My invention has for its object to furnish an improved machine, simple in construction, inexpensive in manufacture, strong and durable; and It consists in the construction and combination of various parts of the machine, as hereinafter more fully described.

A is the frame of the machine, consisting of two long bars connected by cross-bars.

To the end cross-bars of the frame A are attached the axles B, upon which the wheels C revolve.

To one of the wheels C is attached a bevel-gear wheel, D, the teeth of which mesh into the teeth of the small crank-gear wheel E, which revolves upon a journal formed upon the end of the bar F.

The bar F is pivoted to the end cross-bar of the frame A, and to its other end is pivoted the end of connecting-bar or rod G, the other end of which is pivoted to the lever H.

The lower end of the lever H passes through a keeper, I, attached to the rear side of the frame A, and is pivoted to said frame.

The lever H is held up against the frame A by a spring, $h^1$, placed within said keeper I, and is held in any desired position by a pin, $h^2$, attached to the inner side of said lever, and which enters holes in a plate attached to the said frame A.

The upper end of the lever H projects upward into such a position that it may be conveniently operated by the driver from his seat, to throw the gear-wheel E into and out of gear with the gear-wheel D.

The lever H is operated by pressing back its upper end against the spring $h^1$, thus withdrawing the pin $h^2$ and allowing the said lever to move.

To the crank-pin of the wheel E is pivoted one end of the connecting bar J, the other end of which is pivoted to the sliding bar K, so that the said bar may be moved back and forth by the advance of the machine.

To the bar K are attached plates, L, which pass through a slot in the front bar of the frame A, and extend beneath the open bottom of the hoppers M, said plates being made of such a breadth as to be always beneath said hoppers as they move back and forth.

The hoppers M rest upon and are secured to the bottom boards N, which are attached to the frame A, and which have holes formed through them corresponding in shape and size with the open bottom of the hoppers, so that the said holes may be, in fact, a continuation of the interior of the hoppers.

The plates L fit into, and move back and forth in, the space between the boards N and the boards O, also attached to the frame A.

In the plates L are formed holes, into which are fitted cups, P, which may be made of different sizes, according to the size of seed and the amount of seed to be dropped for a hill.

The cups P are so placed in the plates L that when the said plates L are moved in one direction by the movement of the bar K the cups P pass beneath the open lower end of the hoppers M and become filled with seed.

As the plates L are moved in the other direction the filled cups P are carried between the boards N and O, and the seed drops through holes in the lower boards O and falls into the open upper ends of the spouts Q, by which it is conducted to the ground.

R is a shaft that works in bearings attached to the frame A, and to which the upper ends of the conductor-spouts Q are attached, by means of iron straps, which pass around and are secured to the upper ends of said spouts, and the ends of which are passed through the said shaft R, are slightly bent, and are secured in place by a wedge driven between the said ends.

To the forward sides of the spouts Q is riveted a bar, S, to which is riveted or otherwise secured the braces T, the upper ends of which are secured to the shaft R.

To the lower end of the bar S is secured a plow, U, for opening a furrow to receive the seed.

To the lower end of the bar S are also secured the wings V, which are curved to pass around the lower end of the spouts Q, and project at its rear side, and the rear ends of which project downward to escape down the sides of the furrow, and fill it, thus covering the seed.

The shaft R is turned to raise the lower ends of the spouts Q and their attached plows from the ground by the lever W, the lower end of which is rigidly attached to the said shaft R, and the upper end of which projects upward into such a position that it may be conveniently reached and operated by the driver from his seat.

X is a notched catch-bar or plate, attached to the frame A or to the seat-support Y, to receive and hold the lever W in its different positions.

The seat-support Y is so formed as to serve as a tool-box, and to it are attached the springs upon which the seat Z rests.

To the under side of the bar K are attached two short rack-bars, A', into the teeth of which mesh the teeth of the segmental gear-wheels B', which are secured to the outer ends of the shafts C¹, which work in bearings attached to the frame A, and to the other ends of which are attached, or upon them are formed, cranks D', to the crank-arms of which are pivoted the upper ends of the connecting-rods or bars E', the other ends of which are pivoted to the bar or beam F', so as to suspend the said bar or beam in such a way that it may be raised or lowered alternately at regular intervals by the advance of the machine.

To the under side of the bar or beam F' are attached two jointed arms, G', in such positions as to be directly in the rear of the spouts Q, which, as the bar or beam F' is lowered, strike the ground and mark the hills.

To the upper side of the bar or beam F' are attached arms, H', which pass up through guide-holes in the frame-work of the machine, to cause the said bar or beam F' to move up and down vertically.

The machine should be so made that the wheels may be twice as far apart as the distance between the rows, and the spouts at a distance apart equal to the distance between the rows, said spouts being equally distant from their adjacent wheels.

By this construction the inner wheel may, each time of crossing the field, follow the track of the outer wheel in the next previous crossing, the wheel-tracks thus serving as guides to the driver, and enabling him, without previously marking the ground, to keep his rows parallel. At the same time the hill-markers enable him to keep his machine so adjusted that the planting will always be in perfect check-row.

To render my machine more serviceable to the farmer I have adapted it to be used as a cultivator, with slight or easily-made changes in the working parts. To the cultivator attachment, however, I do not here lay claim.

In making the change to adapt the machine to operate as a cultivator, the dropping devices are detached and the plow-frame, shown in figs. 4 and 5, attached.

I' are the plow-plates, which are attached to or formed upon an arm or standard, J', which passes up through the beam K', and is secured in place by a nut screwed upon its upper end.

The forward ends of the plow-beams K', six, more or less, of which may be used, are pivoted to a long bar, L'.

The plow-beams K' are secured in place, when adjusted, by bolts, which pass through them and through slots in the bar or beam M', and are secured by nuts.

The bar or beam L' is connected to the shaft R by bands or clevices, N, which pass around the said shaft R and are bolted to the said bar or beam L'.

O' is a hook pivoted to the bar or beam M', and which is hooked upon the lever W, or into a hole formed in the said lever, to enable the plows to be raised from the ground when desired, by operating the said lever W.

P' are guard or fender-wheels, which are made as shown in figs. 4 and 5, and which are designed to prevent clogs, stones, and other substances from being thrown against the plants by the adjacent plows, and thus injuring them, while allowing the fine soil to pass freely to and around the said plants through the openings in said wheels.

The wheels P' are revolved by contact with the ground, and are attached to the opposite ends of a short shaft, Q', so that the said wheels may work one upon each side of the row of plants being cultivated.

The shaft Q' revolves in bearings in the end of a bar or arm, R', attached to the center of the bar or beam M'.

S' is the tongue, which is securely attached to the frame A of the machine, at one side of its central point, to balance the side-draft.

T' is a small roller, pivoted to the lower side of the tongue S', by a bolt, in such a position as to rest against the forward side of the sliding bar K, and keep it and the plates L in proper position while being operated.

Having thus described my invention,

I claim as new and desire to secure by Letters Patent—

1. The combination of the cups P, sliding plates L, sliding bar K, connecting-bar J, crank-gear wheel E, gear-wheel D, and roller T', with each other and with the boards N O, hoppers M, frame A, wheel C, and tongue S', substantially as herein shown and described, and for the purpose set forth.

2. The combination of the shaft R, spouts Q, bars S, braces T, plows U, covering wings V, lever W, and catch-bar or plate X, with each other and with the bottom boards N O, sliding plates L, sliding bar K, connecting-bar J, crank-gear wheel E, gear-wheel D, wheels C, and frame A, substantially as herein shown and described, and for the purposes set forth.

3. The combination of the racks A', gear-wheels B', shaft C', cranks D', connecting-bars E', bar F', jointed arms G', and guide-arms H', with each other and with the frame A and sliding bar K, substantially as herein shown and described, and for the purpose set forth.

FRANKLIN UNDERWOOD.

Witnesses:
SETH H. CONOVER,
FRANCIS UNDERWOOD.